United States Patent
Kjaer et al.

(10) Patent No.: US 12,521,454 B2
(45) Date of Patent: Jan. 13, 2026

(54) $^{68}$Ga- AND $^{64}$Cu-NODAGA-E[c(RGDyK)]$_2$ FOR USE AS PET TRACERS IN THE IMAGING OF ANGIOGENESIS IN HUMANS

(71) Applicant: RIGSHOSPITALET, Copenhagen (DK)

(72) Inventors: Andreas Kjaer, Frederiksberg (DK); Jacob Madsen, Copenhagen (DK); Malene Brandt-Larsen, Copenhagen (DK); Jytte Oxboel, Copenhagen (DK)

(73) Assignee: RIGSHOSPITALET, Copenhagen (DK)

( * ) Notice: Subject to any disclaimer, the term of this patent is extended or adjusted under 35 U.S.C. 154(b) by 0 days.

(21) Appl. No.: 16/762,873

(22) PCT Filed: Nov. 8, 2018

(86) PCT No.: PCT/DK2018/050293
§ 371 (c)(1),
(2) Date: May 8, 2020

(87) PCT Pub. No.: WO2019/091534
PCT Pub. Date: May 16, 2019

(65) Prior Publication Data
US 2020/0282084 A1     Sep. 10, 2020

(30) Foreign Application Priority Data
Nov. 10, 2017  (DK) .......................... PA 2017 70845

(51) Int. Cl.
*A61K 51/00*     (2006.01)
*A61K 51/04*     (2006.01)
*A61M 36/14*    (2006.01)

(52) U.S. Cl.
CPC ............................... *A61K 51/0482* (2013.01)

(58) Field of Classification Search
CPC .............. A61K 51/0482; A61K 51/082; A61K 51/088; G01N 2800/324; G01N 33/57407; G01N 33/57415; G01N 33/60; G01N 33/57438; C07K 7/64; C07K 14/70557
See application file for complete search history.

(56) References Cited

U.S. PATENT DOCUMENTS

2008/0267882 A1     10/2008    Chen et al.

OTHER PUBLICATIONS

Zhai et al. (Mol. Pharmaceutics 2015, 12, 2142-2150).*
Sun et al. (Theranostics 2014, 4, 778-786).*
Rasmussen et al. (Diagnostics 2016, 6, 1-4).*
Cai et al. (Bio. Techniques 2005, 39, S14-S25).*
Kikkawa et al. (Clin. Exper. Metastasis 2002, 19, 717-725).*
Robertson et al. (Current Pharm. Design 2008, 14, 296-305).*
International Search Report and Written Opinion from International Application No. PCT/DK2018/050293, mailed Feb. 6, 2019.
Chakraborty et al. "Toward realization of mix-and-use approach in Ga radiopharmacy; preparation, evaluation and preliminary clinical utilization of 68Ga-labeled NODAGA-coupled RGD peptide derivative." Nuclear Medicine and Biology (2016), vol. 43, No. 1. pp. 116-123.
Oxboel et al. "Comparison of two new angiogenesis PET tracers 68Ga-NODAGA-E(c[RGDyK])2 and Cu-NODAGA-E (c[RGDyK]) in vivo imaging studies in human xenograft tumors." Nuclear Medicine and Biology (2014), vol. 41 pp. 259-267.
Rasmussen et al. "Angiogenesis PET Tracer Uptake (68Ga-NODAGA-E(c[RGDyK]) in Induced Myocardial Infarction in Minipigs." Diagnostics (2016) vol. 6, No. 2. Article 26.
ClinicalTrials.gov Identifier NCT02970786 Phase I Trial 68Ga-NODAGA-E(c[RGDyK]) Positron Emission Tomography for Imagining Angiogenesis in Primary and Metastasis Tumor Lesion in Humans. Nov. 22, 2016.
ClinicalTrials.gov Identifier NCT03271281: PET/CT Imaging of Angiogenesis in Patients with Neuroendocrine Tumors Using 68Ga-NODAGA-E(c[RGDyK]) Sep. 5, 2017.
Eo et al. "Angiogensis Imagining Using 68Ga-RGD PET/CT: Therapeutic Implications." Seminars in Nuclear Medicine (2016), vol. 46, No. 5. pp. 419-427.
Laitinen et al. "Comparision of cyclic RGD peptides for axb3 integrin detection in a rat model of yocardial infarction." Ejnmmi Research, (2013), vol. 3. No. 1. Article 38.
R. Haubner, et al., "[68Ga]NODAGA-RGD—Metabolic Stability, Biodistribution, and Dosimetry Data from Patients with Hepatocellular Carcinoma and Liver Cirrhosis", Eur J Nucl Med Mol Imaging, DOI 10.1007/s00259-016-3396-3; (2016) 43: pp. 2005-2013.
P. A. Knetsch, et al., "[68Ga]NODAGA-RGD for Imaging αvβ3 Integrin Expression", Eur J Nucl Med Mol Imaging, DOI 10.1007/s00259-011-1778-0; (2011) 38: pp. 1303-1312.
M. M. Clausen, et al., "First-In-Human Study of [68Ga]Ga-NODAGA-E[c(RGDyK]2 PET for Integrin αvβ3 Imaging in Patients with Breast Cancer and Neuroendocrine Neoplasms: Safety, Dosimetry and Tumor Imaging Ability", Diagnostics, https://doi.org/10.3390/diagnostics12040851; 2022; 12, 851; 9 pgs.

(Continued)

*Primary Examiner* — Michael G. Hartley
*Assistant Examiner* — Melissa J Perreira
(74) *Attorney, Agent, or Firm* — Merchant & Gould P.C.

(57) ABSTRACT

There is provided two angiogenesis clinical PET tracers, namely 68Ga-NODAGA-E[c(RGDyK)]2 and 64Cu-NODAGA-E[c(RGDyK)]2 for imaging of neo-angiogenesis in humans.

5 Claims, 5 Drawing Sheets

(56) References Cited

OTHER PUBLICATIONS

M. M. Clausen, et al., "First-In-Human Study of [68Ga]Ga-NODAGA-E[c(RGDyK]2 PET for Integrin αvβ3 Imaging in Patients with Breast Cancer and Neuroendocrine Neoplasms: Safety, Dosimetry and Tumor Imaging Ability", Diagnostics, https://doi.org/10.3390/diagnostics12040851; 2022; 12, 851; 15 pgs.

D. J. Kwekkeboom, et al., "Somatostatin Receptor Imaging", Seminars in Nuclear Medicine, vol. XXXII, No. 2, Apr. 2002, pp. 84-91.

F. L. Giesel, et al., "68Ga-FAPI PET/CT: Biodistribution and Preliminary Dosimetry Estimate of 2 DOTA-Containing FAP-Targeting Agents in Patients with Various Cancers", The Journal of Nuclear Medicine, vol. 60, No. 3, Mar. 2019, pp. 386-392.

\* cited by examiner

$^{68}$Ga- AND $^{64}$Cu-NODAGA-E[c(RGDyK)]$_2$ FOR USE AS PET TRACERS IN THE IMAGING OF ANGIOGENESIS IN HUMANS

This application is a National Stage Application of International Application No. PCT/DK2018/050293, filed 8 Nov. 2018, which claims benefit of Serial No. PA 2017 70845 filed 10 Nov. 2017 in Denmark and which applications are incorporated herein by reference. To the extent appropriate, a claim of priority is made to each of the above disclosed applications.

FIELD OF THE INVENTION

The present invention relates to the use of [68Ga]NODAGA-E[c(RGDyK)]2 and [64Cu]NODAGA-E[c(RGDyK)]2 for diagnostic imaging using positron emission tomography (PET) in humans. More specifically the invention relates to the use of such compounds as tracers for imaging angiogenesis, which in turn is used as a diagnostic measure, risk assessment for malignant diseases and heart diseases or as companion diagnostics for angiogenesis and/or anti-angiogenesis therapy.

BACKGROUND OF THE INVENTION

New blood vessels can be formed by two different mechanisms: vasculogenesis or angiogenesis. Angiogenesis is the formation of new blood vessels by branching from existing vessels. The primary stimulus for this process may be inadequate supply of nutrients and oxygen (hypoxia) to cells in a tissue. The cells may respond by secreting angiogenic factors, of which there are many; one example, which is frequently referred to, is vascular endothelial growth factor (VEGF). These factors initiate the secretion of proteolytic enzymes that break down the proteins of the basement membrane, as well as inhibitors that limit the action of these potentially harmful enzymes. The other prominent effect of angiogenic factors is to cause endothelial cells to migrate and divide. Endothelial cells that are attached to the basement membrane, which forms a continuous sheet around blood vessels on the contralumenal side, do not undergo mitosis. The combined effect of loss of attachment and signals from the receptors for angiogenic factors is to cause the endothelial cells to move, multiply, and rearrange themselves, and finally to synthesise a basement membrane around the new vessels.

Angiogenesis is prominent in the growth and remodelling of tissues, including wound healing and inflammatory processes. Tumors must initiate angiogenesis when they reach millimetre size in order to keep up their rate of growth. Angiogenesis is accompanied by characteristic changes in endothelial cells and their environment. The surface of these cells is remodelled in preparation for migration, and cryptic structures are exposed where the basement membrane is degraded, in addition to the variety of proteins which are involved in effecting and controlling proteolysis. In the case of tumours, the resulting network of blood vessels is usually disorganised, with the formation of sharp kinks and also arteriovenous shunts. Inhibition of angiogenesis is also considered to be a promising strategy for antitumour therapy.

The transformations accompanying angiogenesis are also very promising for diagnosis, an obvious example being malignant diseases, but the concept also shows great promise in inflammation and a variety of inflammation-related diseases, including atherosclerosis, the macrophages of early atherosclerotic lesions being potential sources of angiogenic factors.

These factors are also involved in revascularisation of infarcted parts of the myocardium, which occurs if a stenosis is released within a short time.

As mentioned above angiogenesis plays an important role in many pathological processes such as cancer. Integrin $\alpha V\beta 3$ is a cell adhesion molecule and is highly expressed on activated endothelial cells and tumor cells, but not on resting endothelial cells. During the past decade many studies have confirmed the importance of integrin $\alpha V\beta 3$ as a specific target for neo-angiogenesis, due to its role in the tumor growth and metastasis. Extracellular matrix (ECM) proteins such as vitronectin, fibrinogen and fibronectin interact with integrin $\alpha V\beta 3$ via the amino acid sequence Arg-Gly-Asp (RGD). Often reported RGD peptides used for radiolabeling are the cyclic pentapeptides cyclo(Arg-Gly-Asp-D-Phe-Lys), c(RGDfK) and cyclo(Arg-Gly-Asp-D-Tyr-Lys), c(RGDyK), which only differ with one amino acid.

OXBOEL J. et al. /NUCLEAR MEDICINE AND BIOLOGY 2014, Vol. 41, Pages 259-267) disclose the uptake of 68GA-NODAGA-E[c(RGDyK)]2 and 64Cu-NODAGA-E[c(RGDyK)]2 in tumors and the tumors being visible on PET images. The paper further mentions that angiogenesis plays an important role in cancer. Meanwhile, there is no evidence presented in the paper indicating that [$^6$Ga]NODAGA-E[c(RGDyK)]$_2$ or [$^{84}$Cu]NODAGA-E[c(RGDyK)]$_2$ constitute superior markers of neo-angiogenesis or diagnosing cancer in humans (in vivo).

There is a need for new candidates for PET imaging of integrin $\alpha V\beta 3$ receptor in humans. In this respect many animal studies have been conducted but due to low predictability of such candidate PET tracers from animal to human applicability more human clinical trials are required for obtaining better tracers of angiogenesis in humans.

SUMMARY OF THE INVENTION

The present inventors have based on clinical trials in humans found that [$^6$Ga]NODAGA-E[c(RGDyK)]$_2$ which targets integrin $\alpha_v\beta_3$ constitutes a superior marker of neo-angiogenesis in humans. Similar observations have been made with [$^{64}$Cu]NODAGA-E[c(RGDyK)]$_2$.

They are produced by complexing the positron emitting radionuclide, Gallium-68 or Copper-64, with a NODAGA chelator attached to the peptide Glutamoyl-bis-cyclo (L-argininylglycyl-L-a-aspartyl-D-tyrosyl-L-lysyl). The chemical structure of [$^{68}$Ga]NODAGA-E[c(RGDyK)$_2$ is shown below.

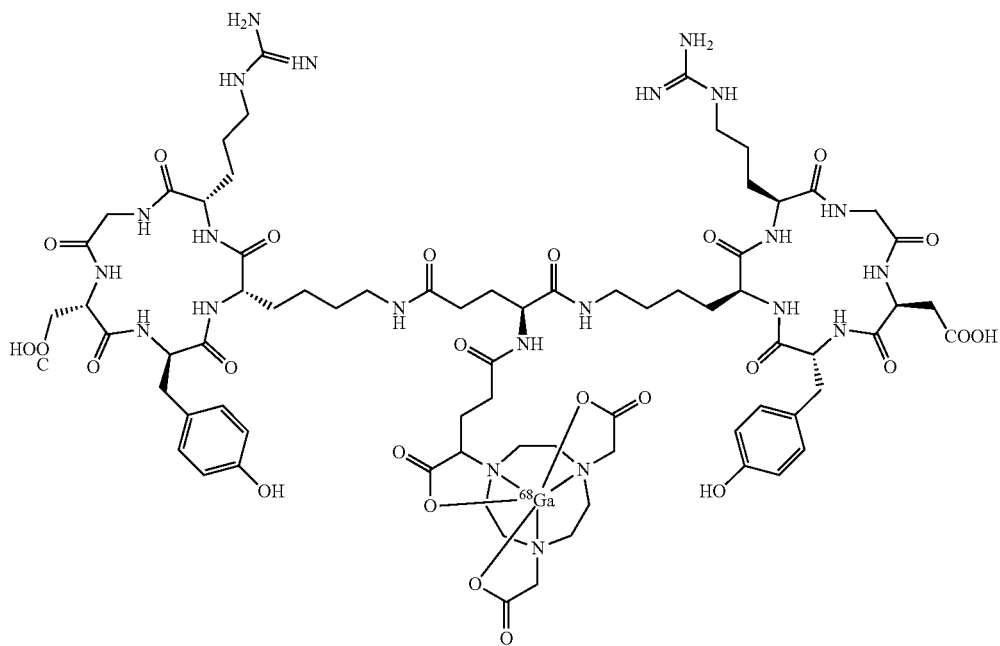

In accordance with the present invention diseases and indications associated with angiogenesis are e. g. different forms of cancer and metastasis, e. g. breast, skin, colorectal, pancreatic, prostate, lung, brain, hepatocellular, neuroendocrine, or ovarian cancer. Other diseases and indications are inflammation (e.g. chronic), atherosclerosis, rheumatoid arthritis and gingivitis.

Further diseases and indications associated with angiogenesis are arteriovenous malformations, astrocytomas, choriocarcinomas, glioblastomas, gliomas, hemangiomas (childhood, capillary), hepatomas, hyperplastic endometrium, ischemic myocardium, endometriosis, Kaposi sarcoma, macular degeneration, melanoma, neuroblastomas, occluding peripheral artery disease, osteoarthritis, psoriasis, retinopathy (diabetic, proliferative), scleroderma, seminomas and ulcerative colitis.

The present inventors have shown that $^{68}$Ga-NODAGA-E[c(RGDyK)]$_2$ and $^{64}$Cu-NODAGA-E[c(RGDyK)]$_2$ effectively visualize angiogenesis in humans. The inventors have demonstrated the imaging capabilities both preclinically and in a clinical phase I trial of 10 cancer patients (breast cancer and neuroendocrine tumors). Moreover, the present inventors have scanned additional cancer patients as well as patients with myocardial infarction.

In a broad aspect of the present invention there is provided a method of imaging tissue in a human for detecting progression of angiogenesis, said method comprising contacting with or administering to a tissue a compound of formula I,

I

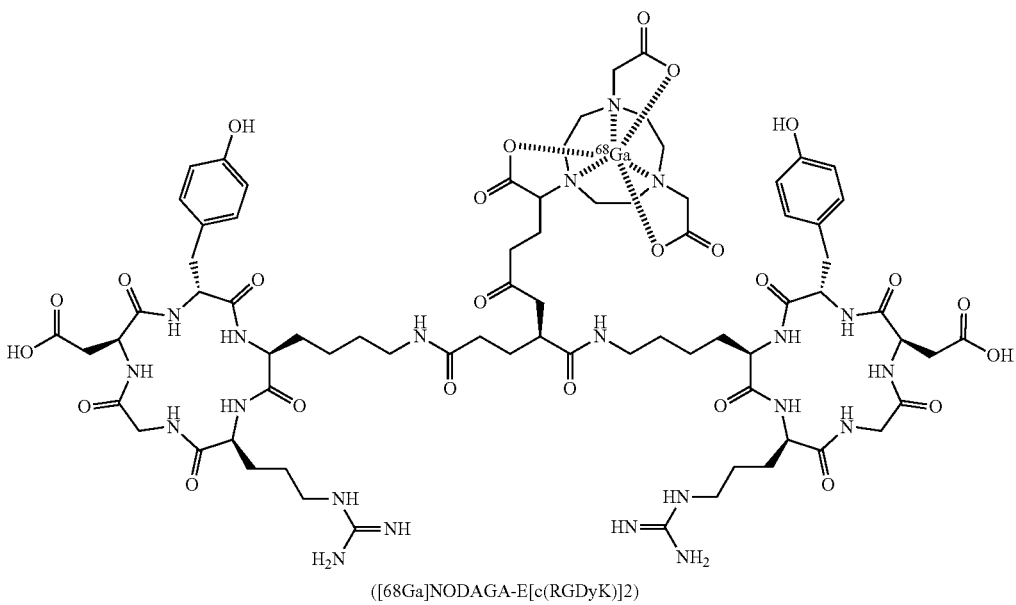

([68Ga]NODAGA-E[c(RGDyK)]2)

and
imaging the tissue with an imaging system. Alternatively, in formula I 68Ga is replaced with 64Cu. As will appear from the remaining disclosure the invention is primarily concerned with the imaging of cancer in a tissue at question, including metastases. A preferred imaging system is a PET imaging system.

Since the method is particularly suited for the detection of angiogenesis associated with disease progression or healing the present invention provides in a preferred embodiment a method of diagnosing the presence of one or more angiogenesis related diseases comprising:

contacting or administering to a tissue a compound of formula I,

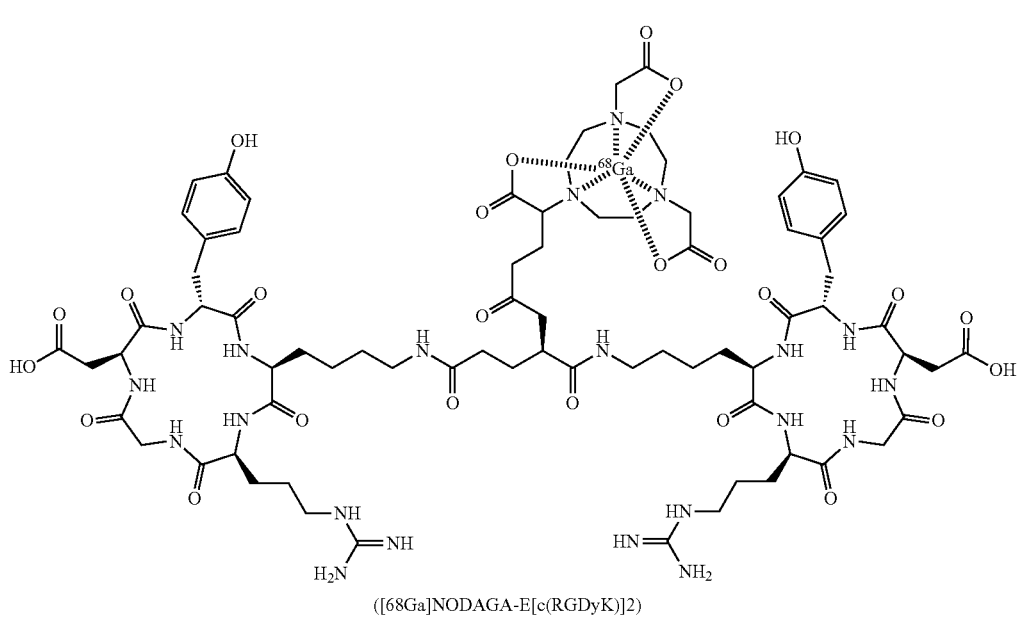

([68Ga]NODAGA-E[c(RGDyK)]2)

and imaging the tissue with an imaging system, wherein the location of the compound corresponds to the location of the angiogenesis related diseases. Again, the major purpose of the invention is to conduct imaging of cancer in the tissue. Alternatively, the purpose is to achieve the angiogenic response in healing of various diseases e.g. myocardial infarction.

Preferably the imaging system is a PET imaging system. It is also preferred that the imaging includes imaging of liver tumors or liver metastasis.

It is generally accepted that a method that could non-invasively demonstrate the level of neo-angiogenesis in tumors could be used for selection of patients for anti-angiogenesis therapy (i.e. use as a companion diagnostics). In heart disease, in particular acute myocardial infarction, induction of neo-angiogenesis is a predictor of final infarct size. Accordingly, the method can be used in the acute phase to predict and plan therapy. Also, both stem cell therapy and gene therapy in these patients are targeted at induction of angiogenesis.

Therefore, the method of the present invention can be used to select for and therapy monitoring of these therapies.

DETAILED DESCRIPTION OF THE INVENTION

As the active substance ([$^{68}$Ga]NODAGA-E[c (RGDyK)$_2$) is never obtained in its isolated form, but is instead automatically formulated in the final product. Data on manufacture, characterisation and analysis of the active substance is essentially the same as for the drug product and this can, therefore, be found in the following. [$^{68}$Ga] NODAGA-E[c(RGDyK)$_2$ is produced by labelling NODAGA-E[c(RGDyK)₂ acetate with ⁶⁸GaC₃ in the presence of a 1.4 M sodium acetate buffer containing ethanol as a scavenger (stabilizer against radiolysis). Similarly the corresponding 64Cu conjugate can be produced by a 64Cu salt.

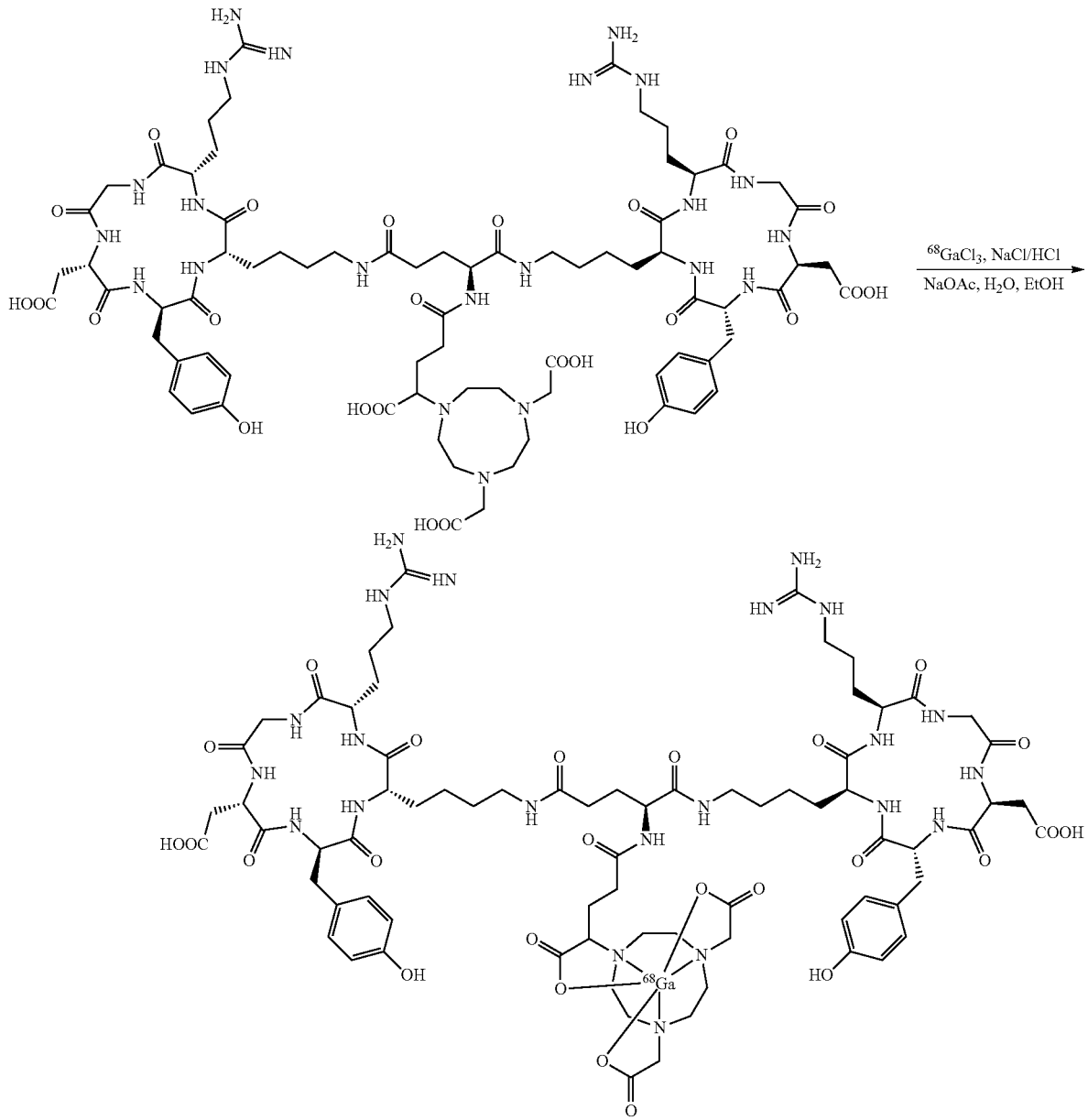

The product is formulated as an isotonic sterile injection solution. The labelled product is eluted from a solid phase extraction cartridge (C18) with sterile 50% ethanol solution, then through a vented 0.22 μm sterile filter into an empty sterile 10 m vial. The labelled product is formulated with a sterile saline solution, which is passed through the C18 cartridge, then through the 0.22 μm sterile filter into the sterile 10 ml vial.

Radiosynthesis is carried out on a ModularLab PharmTracer chemistry system, and the synthesis has been optimized regarding buffer pH (1.4 M NaOAc buffer, pH 4.5), reaction temperature (60° C.) and time (300 sec) with respect to radiochemical yield. The reaction mixture is purified with a C-18 SepPak cartridge to ensure high radiochemical purity. Any free gallium ions will pass through the cartridge, whilst the labelled product is retained and subsequently eluted with 50% aqueous ethanol.

A phase I trial has successfully been conducted with the new radio tracer 68Ga-NODAGA-E[c(RGDyK)]2 for PET imaging of angiogenesis. The tracer identifies the tumors in humans with a high level of angiogenesis. Furthermore, the tracer has shown to be useful in early response assessment to anti-angiogenic treatment. In addition, ongoing phase II studies have demonstrated uptake in various cancer types as well as in myocardial infarction in patients.

This human study has also confirmed sufficient safety, biodistribution and dosimetry in repeated PET imaging (10 minutes, 1 hour and 2 hours post injection).

Figure 1:
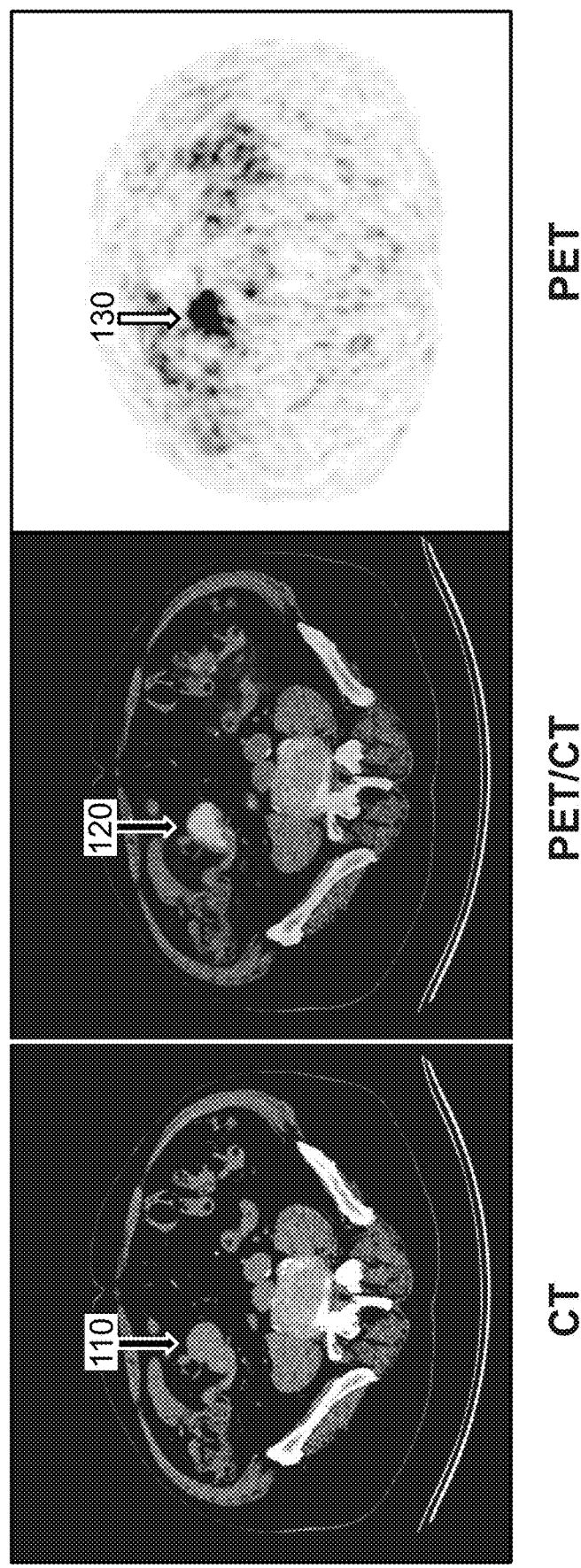
FIG. 1 shows angiognenesis PET scan of primary neuroendocrine tumor in the intestine. The tracer used was ([$^{68}$Ga]NODAGA-E[c(RGDyK)]$_2$.
Figure 3:
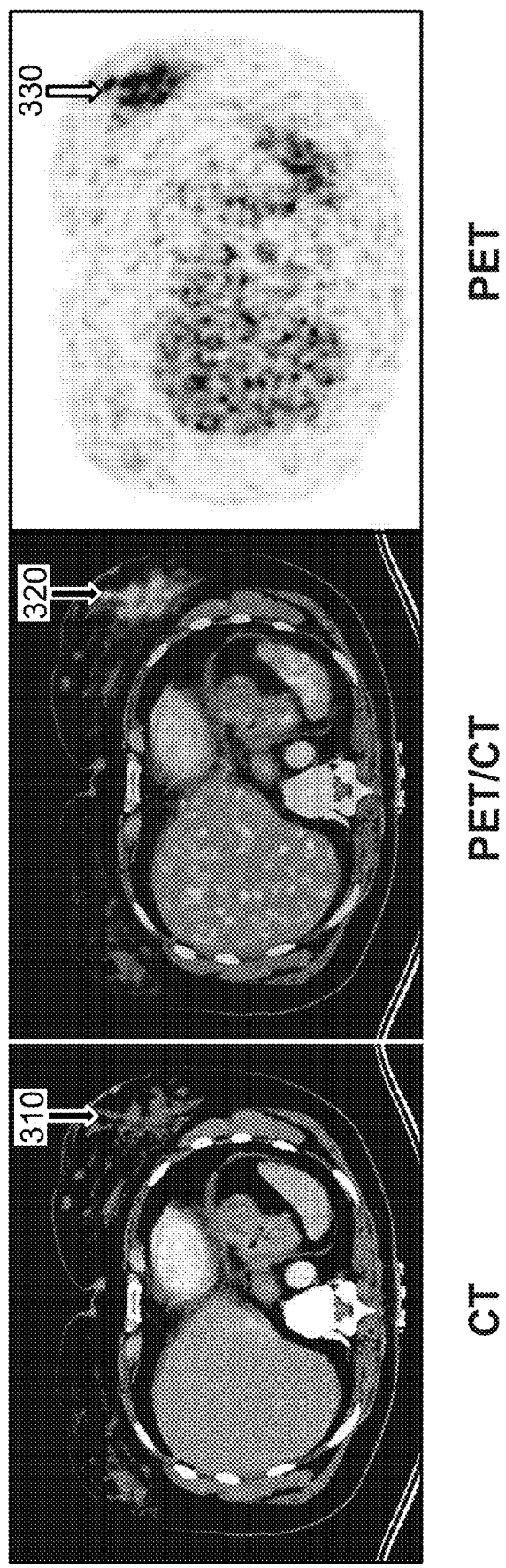
FIG. 3 shows angiogenesis PET scan of primary breast cancer.

As appears from FIGS. 1 and 3 that the tracer clearly detects primary tumors of different types, e.g. neuroendocrine tumors (arrows 110, 120, and 130) and breast cancer (arrows 310, 320, and 330), respectively.

Figure 2:
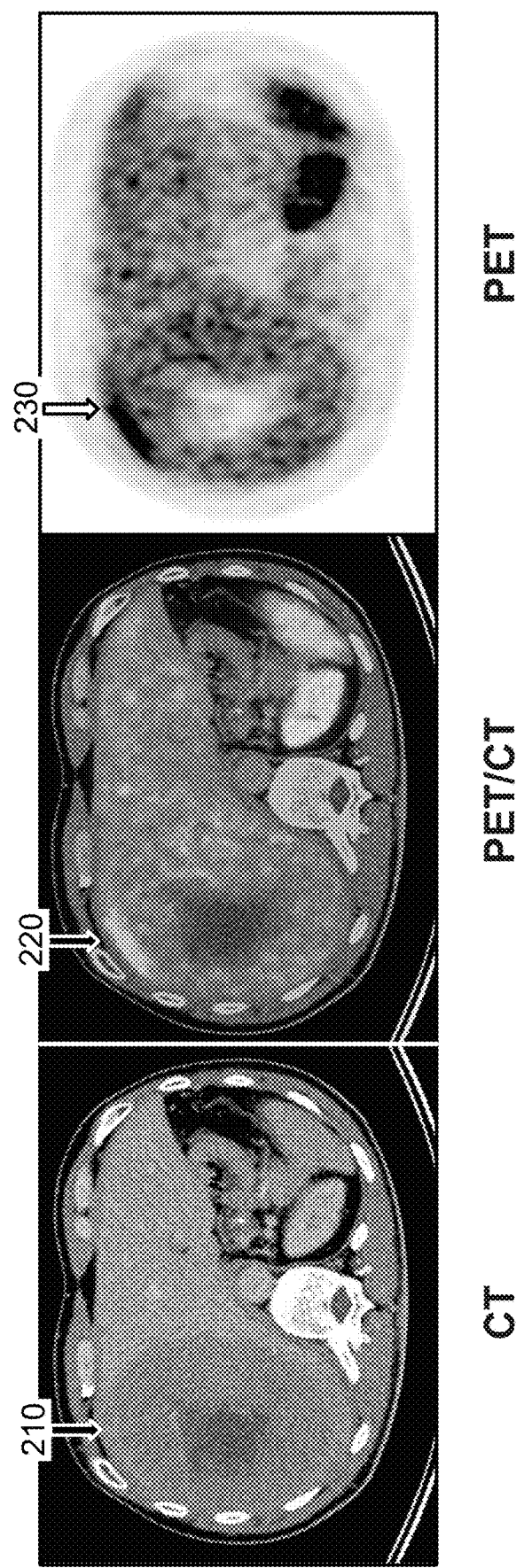
FIG. 2 shows angiogenesis PET scan of liver metastases from a neuroendocrine tumor. Please note the high uptake anteriorly in the metastasis. The tracer used was ([$^{68}$Ga] NODAGA-E[c(RGDyK)]$_2$.
Figure 4:
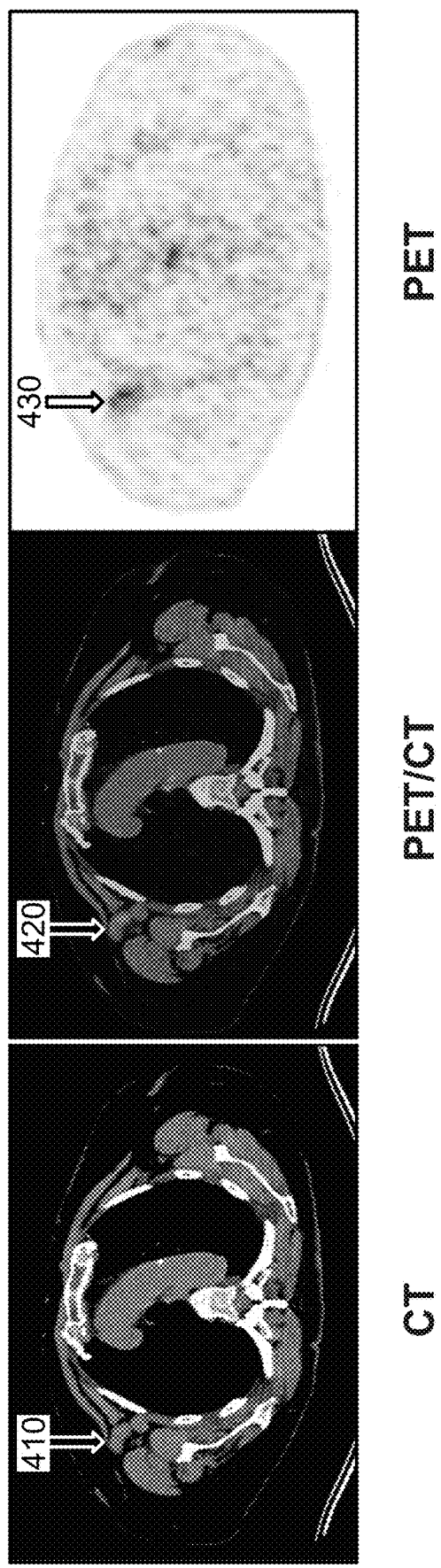
FIG. 4 shows angiogenesis PET scan of lymph node metastasis from breast cancer.

In FIGS. 2 and 4 the scans give surprising well-resolved pictures of angiogenesis associated with liver metastases originating from a neuroendocrine tumor (arrows 210, 230, and 240) and a lymph node metastasis from a breast cancer (arrows 410, 420, and 430), respectively.

Figure 5:
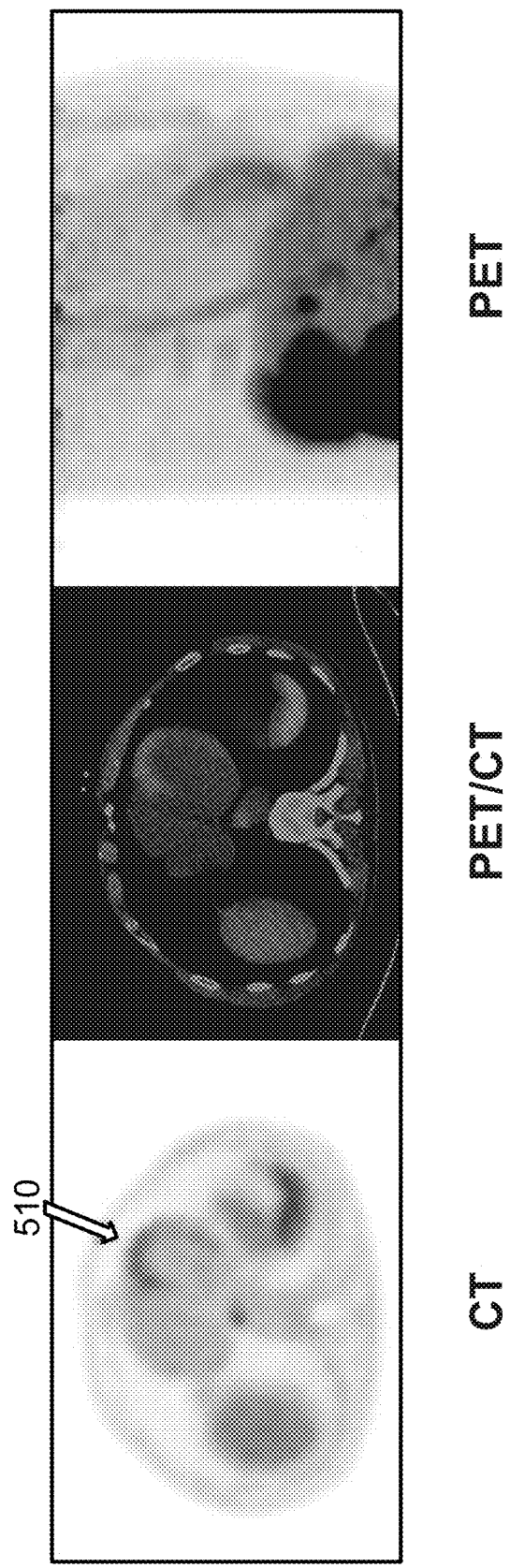
FIG. 5 shows angiogenesis in a human myocardial infarction.

In FIG. 5 there is shown Imaging of the angiogenic (arrow 510) response in a days old myocardial infarction in a human patient clearly demonstrating that in this particular patient induction of angiogenesis was seen. This may be used e.g. for risk stratification, selection of therapy or monitoring of therapy.

The invention claimed is:

1. A method of imaging tissue in a human for detecting progression of angiogenesis in cancer metastasis, said method comprising contacting with or administering to a tissue a compound of formula I,

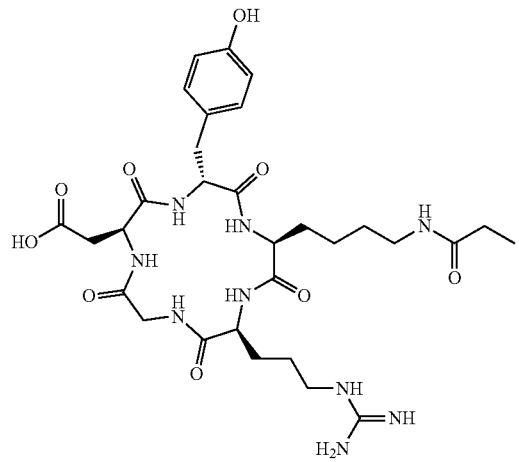

I

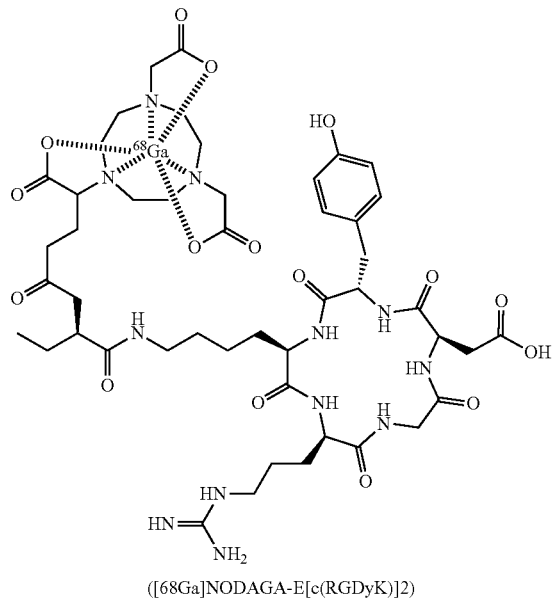

([68Ga]NODAGA-E[c(RGDyK)]2)

and imaging the tissue with a positron emission tomography (PET) imaging system, wherein said cancer metastasis is liver metastasis or lymph node metastasis having a tumor to liver ratio of at least 3.7.

2. A method of diagnosing the presence of one or more angiogenesis related metastatic cancer diseases in a human comprising:

contacting or administering to a tissue a compound of formula I,

I

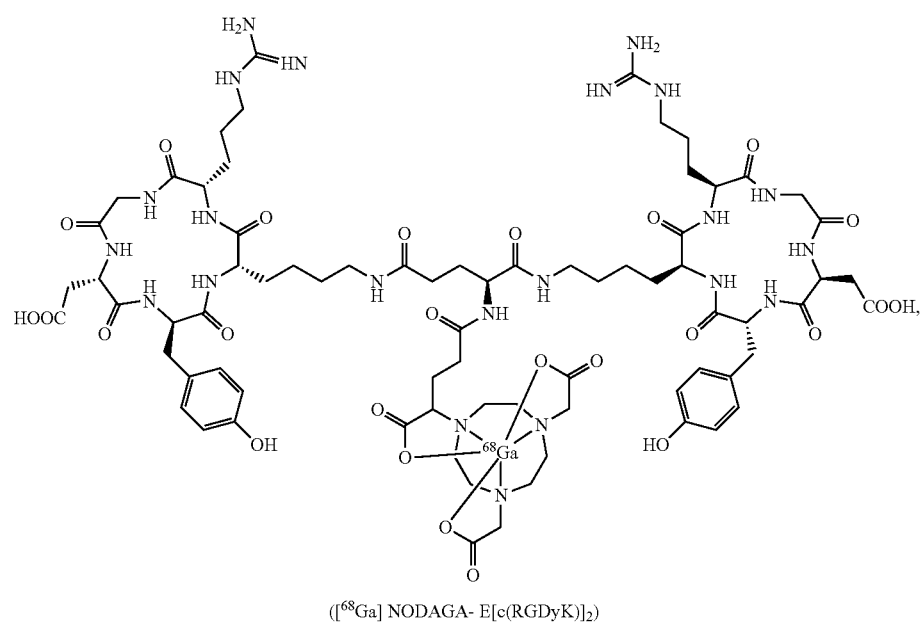

([$^{68}$Ga] NODAGA- E[c(RGDyK)]$_2$)

and
   imaging the tissue with an imaging system, wherein the imaging includes PET imaging of liver metastases or lymph node metastases having a tumor to liver ratio of at least 3.7, and wherein the location of the compound corresponds to the location of the angiogenesis related metastatic cancer diseases in the human.

3. The method of claim 2, wherein the imaging system is a PET imaging system.

4. A method of imaging tissue in a human for detecting progression of angiogenesis in cancer metastasis, said method comprising contacting with or administering to a tissue [$^{64}$Cu]NODAGA-E[c(RGDyK)]$_2$, and imaging the tissue with an imaging system, wherein the imaging system is a PET imaging system, wherein said cancer metastasis is liver metastasis or lymph node metastasis having a tumor to liver ratio of at least 3.7.

5. A method of diagnosing the presence of one or more angiogenesis related metastatic cancer diseases in a human comprising contacting or administering to a tissue [$^{64}$Cu]NODAGA-E[c(RGDyK)]$_2$ and imaging the tissue with a positron emission tomography (PET) imaging system, wherein the imaging includes imaging of liver metastases or lymph node metastases, and wherein the location of the compound corresponds to the location of the angiogenesis related metastatic cancer diseases in the human, and the metastases have a tumor to liver ratio of at least 3.7.

* * * * *